United States Patent

[11] 3,596,712

| [72] | Inventors | James T. Matsuoka<br>Brecksville;<br>Armindo Cantarutti, Akron, both of, Ohio |
|---|---|---|
| [21] | Appl. No. | 803,344 |
| [22] | Filed | Feb. 28, 1969 |
| [45] | Patented | Aug. 3, 1971 |
| [73] | Assignee | Stewart Bolling & Co. Inc.<br>Cleveland, Ohio |

[54] MIXING MACHINE ROTOR
4 Claims, 10 Drawing Figs.

[52] U.S. Cl. ................................................ 165/92,
165/154
[51] Int. Cl. ................................................ F28f 5/04
[50] Field of Search ................................................ 165/86—93

[56] References Cited
UNITED STATES PATENTS

| 2,379,895 | 7/1945 | Feldstein | 165/92 X |
| 2,753,159 | 7/1956 | Christian | 165/87 |
| 2,788,960 | 4/1957 | Skinner et al. | 165/87 X |
| 3,020,025 | 2/1962 | O'Mara | 165/87 |
| 3,263,748 | 8/1966 | Jemal et al. | 165/87 |
| 3,423,074 | 1/1969 | Loomans | 165/87 X |

*Primary Examiner*—Edward J. Michael
*Attorney*—Watts, Hoffman, Fisher & Heinke

ABSTRACT: A bladed rotary member of the type used to mix or work rubber or plastic material and the like, having an elongated body with a bladed portion and a central cavity through which heat exchange fluid is circulated. Structure within the bladed portion establishes specific flow paths to direct circulating fluid adjacent the surfaces of the rotor blades.

Patented Aug. 3, 1971 3,596,712

INVENTORS
JAMES T. MATSUOKA
ARMINDO CANTARUTTI
BY
Watts, Hoffmann, Fisher & Heinke
ATTORNEYS.

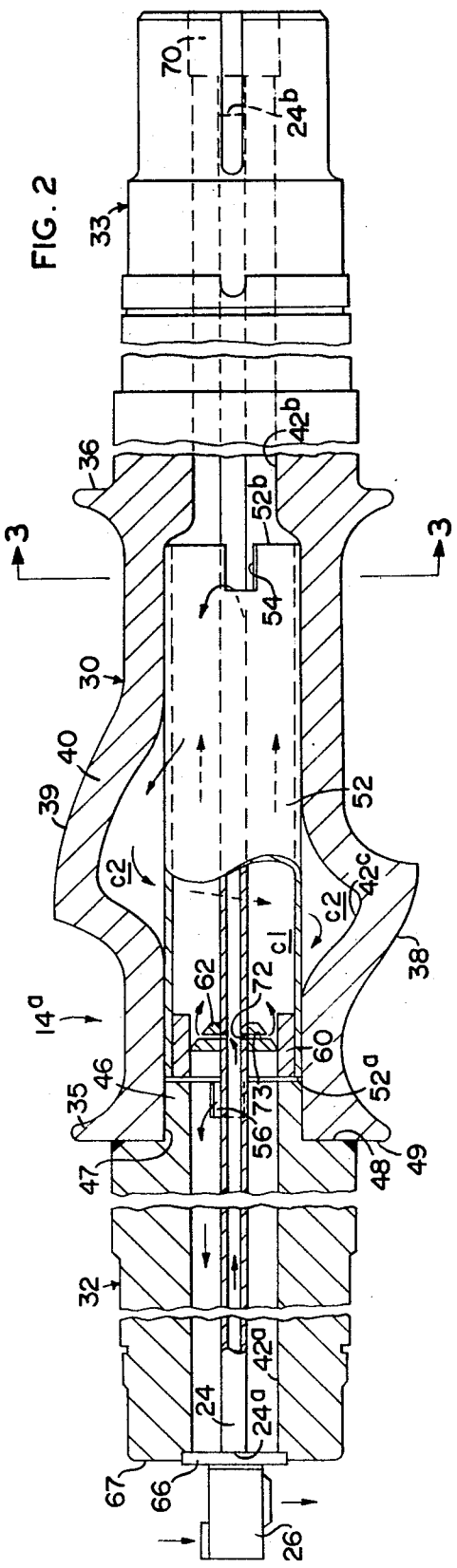
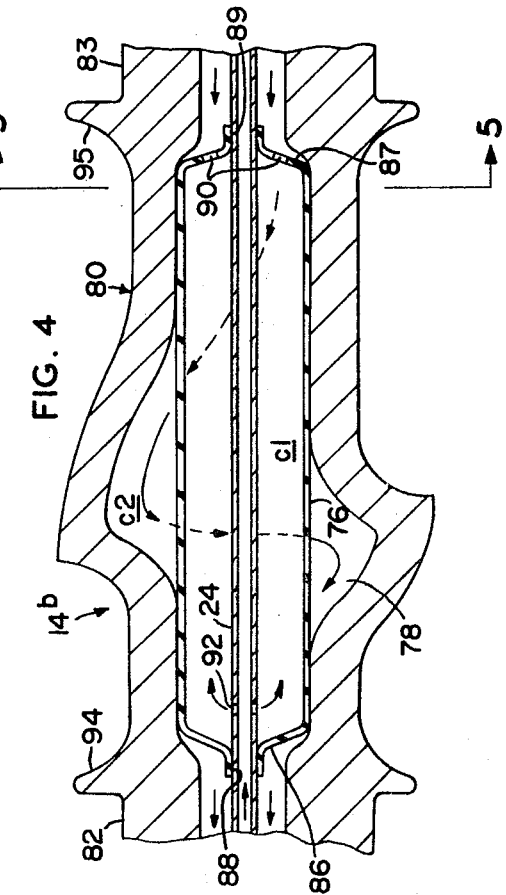
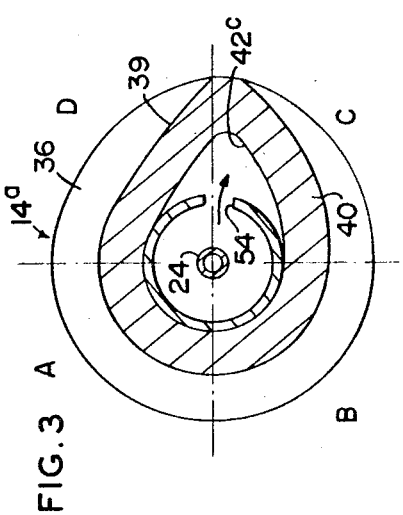

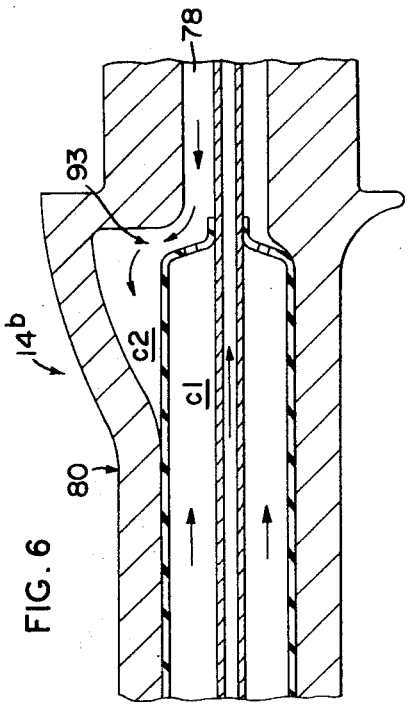
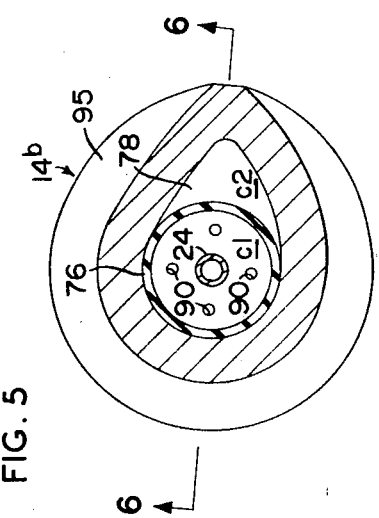
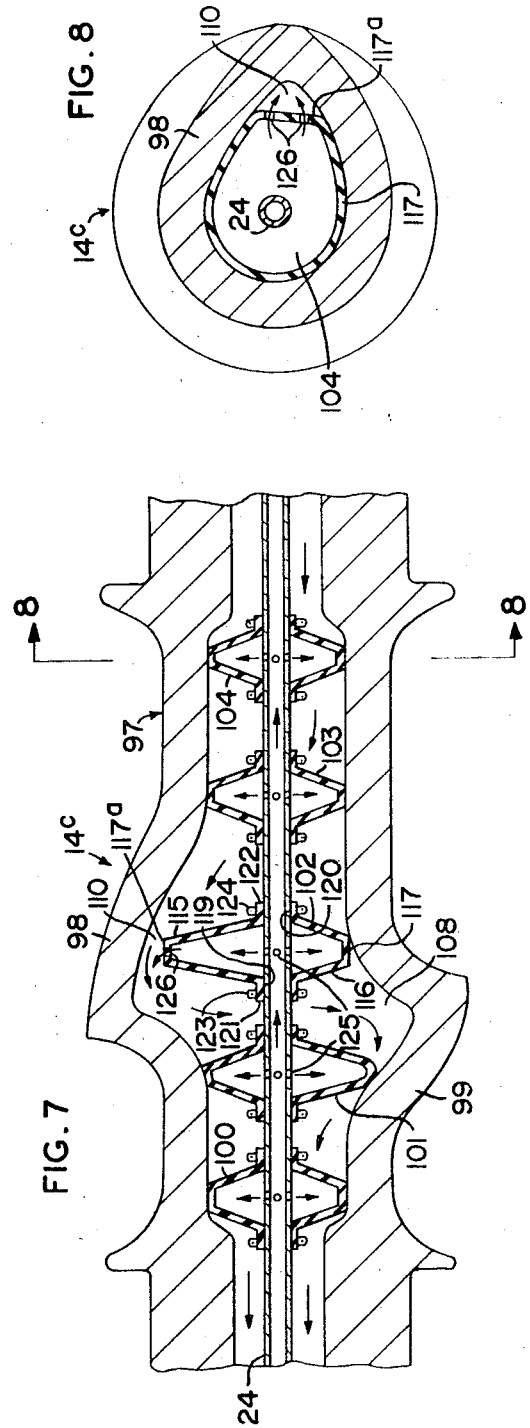

Patented Aug. 3, 1971
3,596,712
4 Sheets-Sheet 4
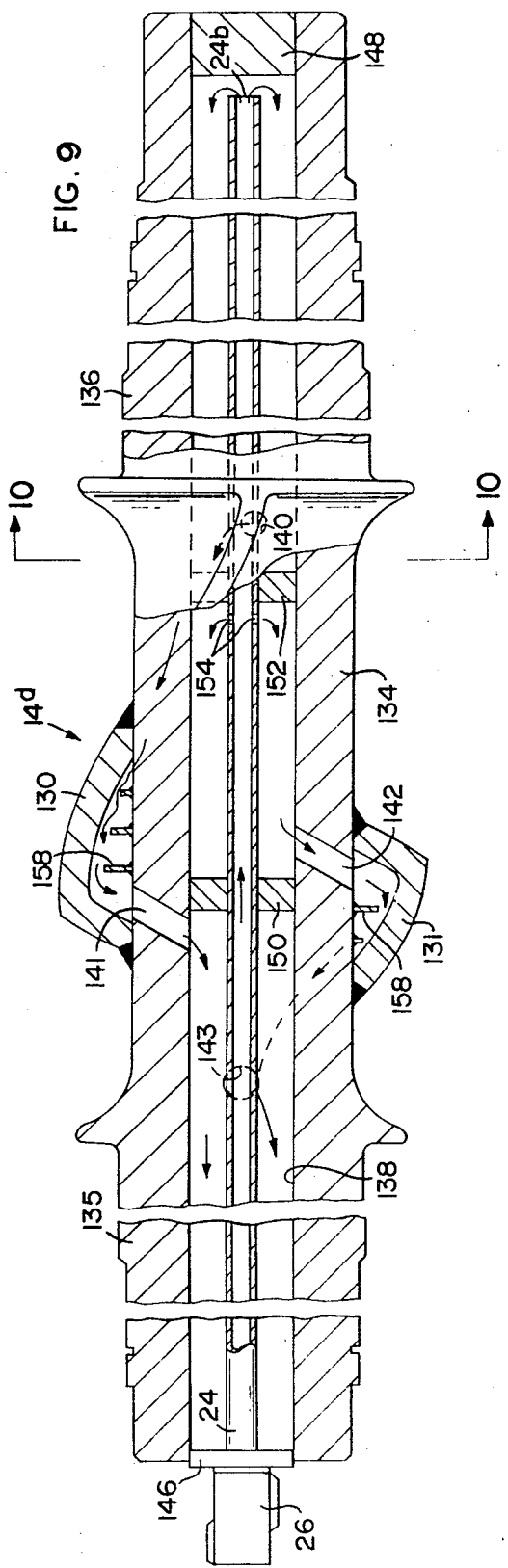
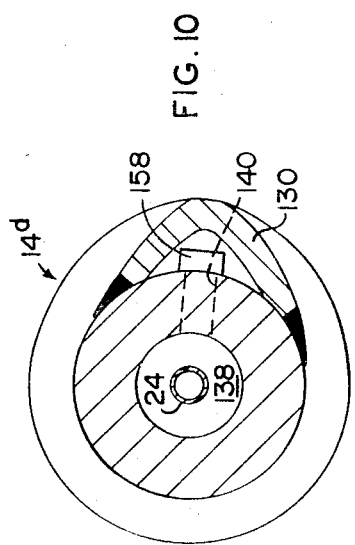
INVENTORS
JAMES T. MATSUOKA
ARMINDO CANTARUTTI
BY
Watts, Hoffmann, Fisher & Heinke
ATTORNEYS 3,596,712

MIXING MACHINE ROTOR

TECHNICAL FIELD

This invention relates to bladed rotors for machines used to mix or work rubber or plastic material and the like, and more particularly to rotors having improved heat transfer capabilities.

DESCRIPTION OF PRIOR ART

Machines for mixing rubber or plastic material and the like in which the material is worked and mixed by rotors in a chamber and then discharged are well known. Typically, the temperature of the material being mixed is raised due to the mechanical working effected during mixing. Prior arrangements for at least partially controlling the temperature of the material during mixing have included passageways for the circulation of heat exchange fluid in wall portions of mixing chambers and supply pipes extending within hollow rotors to establish a general flow of heat exchange fluid within the rotor or rotors from one end toward the other. This basic approach to rotor cooling has advantages in its simplicity, but is relatively inefficient in transferring heat, since a large volume flow must be established throughout the entire central cavity of the rotor, to move a small portion of the flow along and in direct contact with the inner surfaces of the rotor blades, where heat transfer takes place. One problem in improving the heat transfer efficiency is that the rotor blades have a complex shape that makes it difficult to establish flow paths or passages that assure efficient utilization of the circulating heat transfer fluid.

SUMMARY OF THE INVENTION

The present invention overcomes the above problem and others by providing a rotor for a mixing machine of the type referred to for mixing rubber, plastic and the like, which has improved means for controlling the circulation of heat transfer fluid within the rotor, to conduct the fluid in defined paths adjacent surfaces of the rotor blades.

This invention further provides an improved rotor of the type referred to that includes at least one chamber in a central passageway of the rotor for receiving heat exchange fluid from an inlet pipe and which establishes a path of fluid flow in which heat exchange fluid is directed along inner surfaces of the rotor blades.

Embodiments of this invention feature an improved rotor of the type referred to in which means forming a chamber in the central passageway for receiving heat exchange fluid and establishing a desired path of flow is flexible and resilient so that the chamber forming means can be inserted into the central passageway through an opening of the rotor that is smaller and/or different in shape from the chamber.

This invention further provides an improved rotor of the type referred to in which flow of heat transfer fluid along the inside surfaces of rotor blades is restricted to a limited path which provides a relatively high velocity of flow and which includes obstructions to establish turbulent flow to enhance heat transfer.

These and other features and advantages of this invention will become more apparent from the detailed description that follows, when considered in connection with the accompanying drawings.

DESCRIPTION OF THE DRAWINGS

FIG. 2 is a front view, partly in section and partly in elevation, of a rotor of two-piece, welded, construction embodying the present invention;

FIG. 3 is a transverse sectional view of the rotor of FIG. 2, taken along the line 3–3 and looking in the direction of the arrows;

FIG. 4 is a longitudinal sectional view of a one-piece rotor, illustrating another embodiment of the present invention;

FIG. 5 is a transverse sectional view taken along the line 5–5 of FIG. 4 and looking in the direction of the arrows;

FIG. 6 is a partial longitudinal sectional view of the rotor of FIG. 4, taken along the line 6–6 of FIG. 5, and looking in the direction of the arrows;

FIG. 7 is a longitudinal sectional view of a rotor similar to that shown in FIG. 4, illustrating another embodiment of the present invention;

FIG. 8 is a transverse sectional view taken along the line 8–8 of FIG. 7 and looking in the direction of the arrows;

FIG. 9 is a longitudinal sectional view of a rotor having welded blades, and illustrating another embodiment of the present invention; and FIG. 10 is a transverse sectional view taken along the line 10–10 of FIG. 9 and looking in the direction of the arrows.

DESCRIPTION OF THE INVENTION

Figure 1:
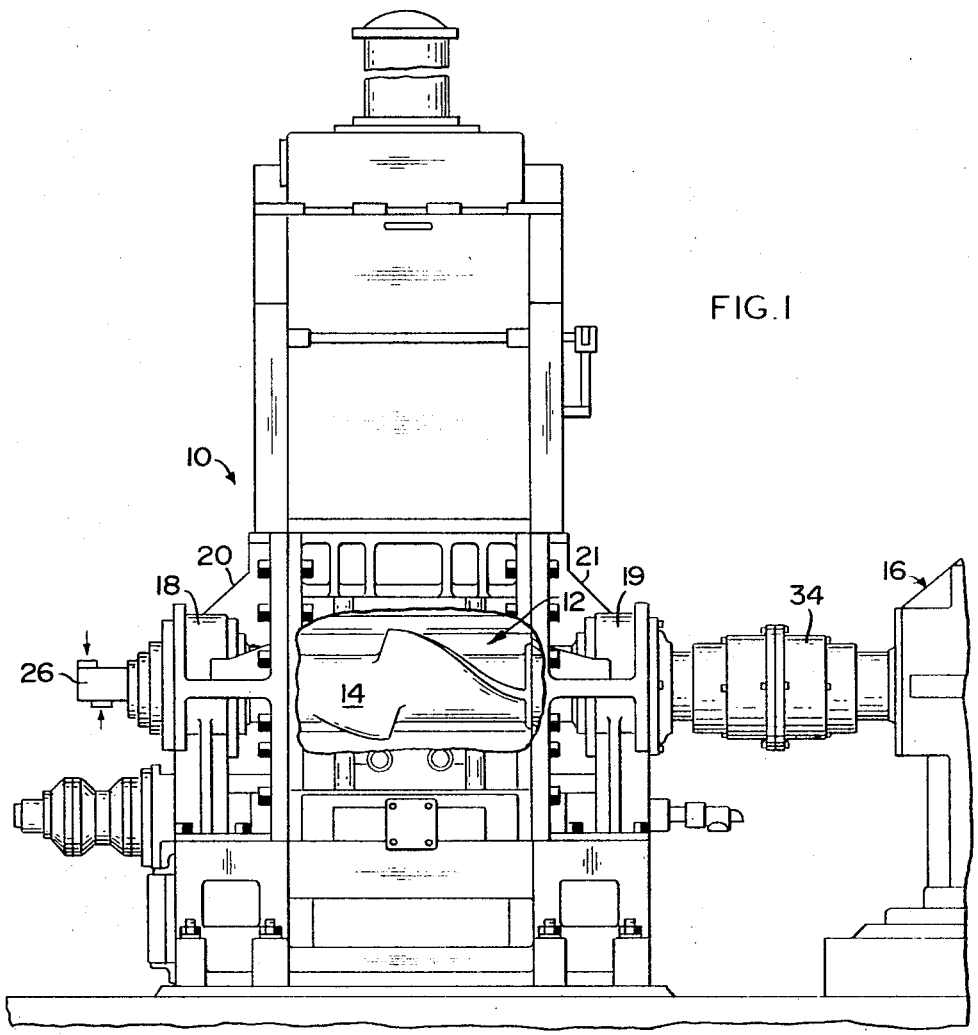
FIG. 1 is a front elevational view, with parts broken away, of a mixing machine of the type used to mix rubber, plastic and the like, illustrating the general arrangement of the machine and a mixing rotor of the type embodying the present invention.

A mixing machine is shown in FIG. 1 of the drawings and indicated generally by reference numeral 10. The machine includes a mixing chamber 12 in which material such as rubber, plastic or the like is mixed by two side-by-side counterrotating rotors, one of which is shown at 14. The rotors 14 are driven by a drive unit 16 to mix materials contained within the chamber 12. Opposite ends of the rotors are journaled in bearing housings 18, 19 in spaced end frames 20, 21 of the machine. A pipe 24 (FIG. 2) is associated with each rotor 14 for carrying heat transfer fluid to an internal cavity of the rotor. The pipe extends within the rotor cavity and the outer end of the pipe 24 is connected to stationary supply and exhaust conduits (not shown) through a rotary union 26.

In accordance with this invention, the rotors 14 include structure defining specific flow paths to direct circulating heat transfer fluid along inner surfaces of blade portions of the rotors. Preferred constructions of rotors embodying the present invention are shown in FIGS. 2 to 10.

With reference to FIG. 2, a rotor 14a of two-piece, welded, construction is shown, which facilitates structure for defining internal flow paths that enhance the heat transfer effect of circulating fluid within the rotor. The rotor 14a is in the form of an elongated body with a central bladed portion 30 and end portions 32, 33 extending in opposite directions from the bladed portion. In use, the central bladed portion is located within the mixing chamber and the end portions are supported for rotation by bearings in the housings 18, 19. One end portion 33 is rotatably driven, as by the drive unit 16 through a coupling 34 (FIG. 1). The bladed portion 30 includes two axially spaced radial shrouds 35, 36 at opposite ends of the bladed portion, and two blades 38, 39. Both blades are twisted, preferably helically, are of unequal length, extend from the shrouds at opposite ends of the bladed portion toward a central portion and extend equal radial distances from the central longitudinal axis of the rotor. The blade 38 extends in a helical path in an inward axial direction from the flange 35, terminating short of the center of the bladed portion. The blade 39 extends in a helical path in an axial direction from the flange 36 toward the flange 35, beyond the mid point of the bladed portion. The inner ends of the blades 38, 39 overlap in an axial direction. The central overlapped portions of the blades are diametrically opposed, and each blade twists helically through approximately 78 degrees along its length from the central portion to the respective flange 35, 36. As best shown in FIGS. 3 and 4, the blades 38, 39 are formed as a part of the rotor body proper. As diagrammatically indicated by quadrants A, B, C, D of the rotor in FIG. 3, the wall of the bladed portion of the rotor is of generally cylindrical shape for about half of the periphery, as in the two quadrants A and B at the plane of cross section and is smaller than the end shrouds. The remainder of the rotor wall, as in quadrants C and D at the plane of cross section of FIG. 3, is elongated to form the blade 39 extending from the central axis of the rotor. This configuration is similar for both blades 38, 39. The rotor wall 40 forming the blade portion is of generally uniform thickness throughout, as shown in FIG. 3.

The end portion 33 and the bladed portion 30, are part of a single casting in this embodiment, while end end portion 32 is fabricated separately and secured to the blade portion adjacent the shroud 35.

A central passageway 42 extends the length of the rotor 14a, and includes portions 42a and 42b of generally cylindrical shape in the two end portions 32, 33, respectively, and a portion 42c of a shape that follows the contour of the blades 38, 39 in the bladed portion of the rotor. That is, the central passageway portion 42c in the bladed portion is elongated radially and twisted in the helix of the blades, being defined by the uniformly thick wall 40 that forms the blades. Except at the longitudinal center part of the bladed portion 30 where blades 38, 39 overlap, the central passageway portion 42c is partly cylindrical, as in quadrants A and B in the plane of FIG. 3, and a portion is elongated transversely of the axis, as in quadrants C and D in the plane of FIG. 3. The separate end portion 32 has a cylindrical boss 46 tightly received within an open end 47 of the central passageway portion 42c at the shroud 35. A radial shoulder 48 of the end portion 32 abuts an end surface 49 of the shroud 35, and is secured thereto, as by welding, during assembly.

A relatively rigid cylindrical tube 52 extends within and substantially the length of the central passageway portion 42c, one end 52a adjacent the shroud 35 and the other end 52b adjacent the shroud 36. The tube 52 is of an outside diameter substantially the same as the inside diameter of the opening 47 and the cylindrical portion of the central passageway 42c so that it can be received in the passageway with a snug fit to form a central chamber C1 within the tube and a peripheral chamber C2 outside the tube and within the blades 38, 39. The tube is larger in diameter than the passageway portions 42a, 42b and is inserted into the passageway portion 42c before the rotor end portion 32 is secured to the shroud 35. An opening 54 in the tube wall at the end 52b provides a passageway between the central chamber C1 and the peripheral chamber C2. A slotlike opening 56 in the cylindrical boss 46 of the rotor end portion 32 provides a passageway between the central and peripheral chambers adjacent the end 52a of the tube 52. These openings 54, 56 are located at a peripheral position adjacent the radially elongated portion of the passageway 42c, as best shown in FIG. 3 in connection with the opening 54.

A mounting ring 60 in the end 52a of the tube 52 supports a plug 62 that is frustoconical in shape. The fluid supply pipe 24 extends within the central passageway 42, substantially the length of the passageway, through the plug 62, which supports the pipe intermediate the pipe ends. An outer end 24a of the pipe is secured to the rotor by a mounting plate 66 recessed in an end surface 67 of the rotor end portion 32. This outer end communicates with the rotary union 26 through which the pipe is connected to a source of fluid and through which the passageway 42 is connected to an exhaust conduit. An inner end 24b of the pipe is open and spaced inwardly from an end plug 70 that closes the central passageway 42 at the outer end of end portion 33. Radially drilled openings 72 are also provided in the pipe 24, aligned with passageways 73 through the tapered surface of the plug 62 so that fluid is introduced into the inner chamber C1 through the pipe openings 72 and the open inner end 24b. Fluid supplied under pressure from these openings circulates through the central chamber C1 on the downstream side of the plug 62, flows through the opening 54 and through the peripheral chamber C2 directly beneath the surface of the blades 39 and 38 and thence through the opening 56 and into the passageway portion 42a. From passageway portion 42a the fluid is exhausted through the rotary union 26.

An embodiment of a one-piece rotor 14b and a chamber-forming tube 76 functionally similar to the tube 52, but structurally different, is shown in FIGS. 4 to 6. The tube 76 is collapsible and resilient and is formed to normally take the cylindrical shape shown, to form a central chamber C1 and a peripheral chamber C2 in a central passageway 78 of the one-piece rotor. As shown, the central passageway follows the contour of the rotor blades in a bladed portion 80 of the rotor and is generally cylindrical and smaller in cross section in opposite end portions 82, 83 of the rotor, substantially as described in connection with the embodiment of FIGS. 2 and 3. Because the tube 52 is collapsible and resilient, it can be inserted through the smaller diameter portion of the passageway 78 in the end portion 82 of the rotor and yet will occupy the central bladed part of the passageway sufficiently to limit the peripheral chamber C2 to the radially extending blade portions, as shown in FIG. 5.

The fluid supply pipe 24 passes through and is partially supported or positioned in spaced relationship to the rotor wall by the tube 76 by virtue of radially extending ends 86, 87 of the tube 76, which have central openings 88, 89, respectively. The end 87 also has additional openings 90. The pipe 24 is open at its inner end, as described in connection with the embodiment of FIGS. 2 and 3, and has intermediate openings 92 within the tube 76. Fluid introduced to the tube 76 from the openings 92 flows out through the openings 90 in the end 87 to assure that fluid is circulated through the chamber C1. The tube 76 terminates inwardly of end shrouds 94, 95 of the bladed portion a sufficient distance to provide openings at opposite ends of the bladed portion 80 between the central passageway 78 adjacent the rotor end portions 82, 83 and the peripheral chamber C2. This is shown in FIG. 6, when the opening or passage adjacent the end portion 83 is indicated at 93. With this construction, fluid flows from the pipe 24 into the tube 76 and into the rotor end portion 83, thence through the passage at 93 between the tube end 87 and the peripheral chamber C2, through the chamber C2 directly beneath the bladed surface of the rotor, out through a passage between the tube end 86 and the chamber C2, similar to the passage 93, to the central passageway 78 in the rotor end portion 82.

FIGS. 7 and 8 show a one-piece rotor 14c having a bladed portion 97 with two blades 98, 99 and with a plurality of flow control inserts 100, 101, 102, 103 and 104 in a central cavity 108 of the bladed portion, spaced along the fluid supply pipe 24 that extends therethrough. Each insert 100 to 104 is similarly constructed but is somewhat differently shaped where necessary due to differences in the shape of the central cavity 108 along its length. Each insert is a separate chamber extending radially from the pipe 24 and matches in cross section the shape of the central cavity at the position of the insert, except that each insert terminates short of the radial extend of the cavity at the bladed portion, to form a passageway 110. The inserts are collapsible and resilient, preferably constructed of plastic or rubber so that they can be deformed to permit insertion into the central cavity 108 and will then assume a preformed shape of the general contour shown.

As best shown in connection with the flow control insert 102 in FIG. 7, the inserts have spaced radial wall portions 115, 116 connected by a peripheral wall portion 117. Aligned openings 119, 120 in the wall portions 115, 116 receive the pipe 24 and flanges 121, 122 extending from the wall portions about the openings 119, 120, respectively, tightly surrounding the pipe and are secured by clamps 123, 124. Openings 125 are provided in the pipe 24 within the chamber formed by each insert 102. A section 117a of the peripheral wall portion 117 of each insert 102 is spaced from the inner wall of the rotor to form the passageway 110 associated with each insert. Openings 126 in the wall section 117a permit the escape of fluid from the chamber of each insert directly to the zone adjacent the inner surface of the blades. The insert itself also restricts flow within the central cavity to the passageways 110 so that all fluid flowing from the pipe 24 is directed in paths adjacent the inner surface of the blades of the rotor. The flow of heat transfer fluid, such as water, is shown diagrammatically in FIGS. 7 and 8 by flow arrows.

FIGS. 9 and 10 show a modified rotor construction 14d on which hollow rotor blades 130, 131 are welded to a continuous, generally cylindrical, central body portion 134 between two end portions 135, 136. A central cylindrical passageway 138 of uniform diameter extends the length of the rotor. Four openings 140, 141, 142, 143 extend through the central body portion 134. Two of the openings 140, 141 are beneath opposite ends of the rotor blade 130, and two of the openings 142, 143 are beneath opposite ends of the rotor blade 131.

The fluid supply pipe 24 extends within the central passageway 138, substantially the length of the rotor 14d. The pipe is supported at its outer end by a plate 146 at the end portion 135 and is connected to the rotary union 26. A plug 148 closes the central passageway at the outer end of the end portion 36. Two plugs 150, 152 surround and support the pipe 24 within the passageway 138 at the central body portion 134 and divide the passageway into three sections. The plug 150 is located axially between the openings 141, 142 and the plug 152 is located axially between the openings 140, 142. The pipe 24 is open at its inner end 24b and has outlet openings 154 between the plugs 150, 152. As a result of this construction, as illustrated by the flow of arrows of FIG. 9, fluid emitted from the end 24b of the supply pipe 24 flows along the rotor end portion 136, is blocked by the plug 152 and therefore flows through the opening 140, through the hollow blade 130 outside the central body portion 134, through the opening 141 and into the passageway 138, where it is restricted to flowing to the rotary union outlet by the plug 150. Fluid emitted from the openings 154 of the pipe 24 fills the central passageway 138 between the plugs 150, 152 and flows through the opening 142 into the hollow blade 131 outside the central body portion 134, through the opening 143 and into the passageway 138, where it is restricted to flowing to the rotary union outlet by the plug 150. To enhance the heat transfer effect of the fluid flowing within the blades 130, 131, fins 158 are welded to the outer surface of central body portion 134 of the rotor beneath, i.e., within, the blades 130, 131. The fins are smaller in size than the passageway through the blades, as shown in FIG. 10. The fins create turbulent flow of the heat transfer fluid and increase the velocity of the flow adjacent the blade surface directly opposite the fins to enhance the rate of heat transfer between the fluid and the rotor blades. In place of the fins, longitudinal dividing walls can be welded beneath the hollow blades to provide longitudinal channels communicating at opposite ends beneath the blades in a manner to provide a series connection and thereby channel flow back and forth beneath the blades to establish a relatively long flow path.

From the preceding description of preferred embodiments of this invention, it will be apparent that the above enumerated objects and others have been achieved and novel rotor constructions of the type referred to have been provided in which a flow of heat transfer fluid within the rotor is directed along restricted paths along inner surfaces of the rotor blades to enhance heat transfer.

While preferred embodiments of this invention have been described in detail, it will be understood that various modifications or alterations may be made therein within the scope and spirit of the invention.

What we claim is:

1. A rotor for a mixing machine of the type used to mix rubber, plastic and the like, comprising an elongated body having a central bladed portion, said body having an internal cavity that is generally cylindrical except at the bladed portion where the internal cavity is enlarged radially to a noncylindrical shape that generally follows the contour of the blade portion, a central pipe extending longitudinally of said body within said internal cavity, a generally cylindrical tubular member within the internal cavity surrounding a portion of said pipe, an opening in said pipe for introduction of fluid to said internal cavity and an opening at one end of said tubular member for circulating of fluid therethrough, said tubular member being dimensioned to fit closely within and occupy the generally cylindrical portions of the internal cavity of the rotor body adjacent the blade portions while leaving radially enlarged portions of the internal cavity unoccupied, and a passageway at each opposite end of said tubular member, communicating between generally cylindrical portions of said internal cavity and the radially enlarged portions of the cavity not occupied by said tubular member.

2. A rotor for a mixing machine of the type used to mix rubber, plastic and the like, comprising an elongated body having a central bladed portion with radially extending blades, said body having an internal cavity that is larger in cross-sectional dimensions within the bladed portion than at opposite ends thereof, a central pipe extending longitudinally of said body within said internal cavity, a collapsible chamber-forming member that is resilient and flexible surrounding a portion of said central pipe within said larger dimensioned portion of the internal cavity, said chamber-forming member blocking a major portion of the cross section of said internal cavity while leaving extending blade portions of the internal cavity unblocked, an opening in the pipe within the chamber-forming member, and an opening in the chamber-forming member communicating with the internal cavity.

3. A rotor for a mixing machine of the type used to mix rubber, plastic and the like, comprising an elongated body having a central bladed portion, said body having an internal cavity that is generally cylindrical except where blades extent from the body portion and enlarge the internal cavity to a noncylindrical shape, a central pipe extending longitudinally of said body within said internal cavity, means defining a plurality of chambers surrounding portions of said pipe and spaced from each other axially along the pipe, shaped and dimensioned to fit closely within and occupy generally cylindrical portions of the internal cavity of the rotor body adjacent the blades while leaving extending blade portions of the internal cavity unoccupied, said means defining said chambers being flexible and resilient, an opening in each of said chambers communicating with extending portions of the internal cavity formed by the blades, and openings in portions of said pipe surrounded by said chamber-defining means for supplying fluid to the chambers.

4. A rotor for a mixing machine of the type used to mix rubber, plastic and the like, comprising: an elongated body with an intermediate generally cylindrical portion between longitudinally spaced radial shrouds and having a central longitudinal passageway; hollow blades welded to said intermediate cylindrical portion each forming an enclosed chamber extending along said body; a plurality of longitudinally spaced, transverse, radial fins extending outward from said cylindrical portion beneath the blades; said body having two longitudinally spaced openings therethrough beneath each blade communicating between opposite ends of each chamber and said central passageway; a pipe extending longitudinally within said central passageway with an opening within the passageway for supplying fluid thereto; and baffle means within said central passageway for directing flow of fluid from said pipe through one of said openings at an end of each of said chambers, across said fins and thence out through said opening at the opposite end of each respective chamber whereby heat transfer fluid can be circulated in restrictive paths along inner surfaces of said blades.

PO-1050
(5/69)

UNITED STATES PATENT OFFICE
CERTIFICATE OF CORRECTION

Patent No. 3,596,712      Dated August 3, 1971

Inventor(s) JAMES T. MATSUOKA and ARMINDO CANTARUTTI

It is certified that error appears in the above-identified patent and that said Letters Patent are hereby corrected as shown below:

First Page - line /73/ "Stewart Bolling & Co. Inc."

should be --INTERCOLE AUTOMATION, INC.--

Signed and sealed this 13th day of June 1972.

(SEAL)
Attest:

EDWARD M. FLETCHER, JR.      ROBERT GOTTSCHALK
Attesting Officer      Commissioner of Patents